Dec. 30, 1947.                D. J. O'BRIEN                2,433,674
                          COMPACT MICROSCOPE
                  Filed Sept. 25, 1945            2 Sheets-Sheet 1
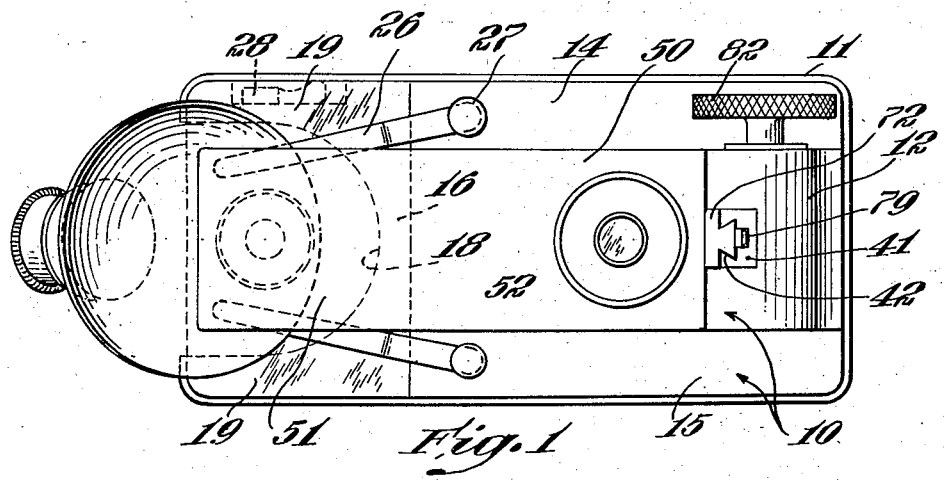
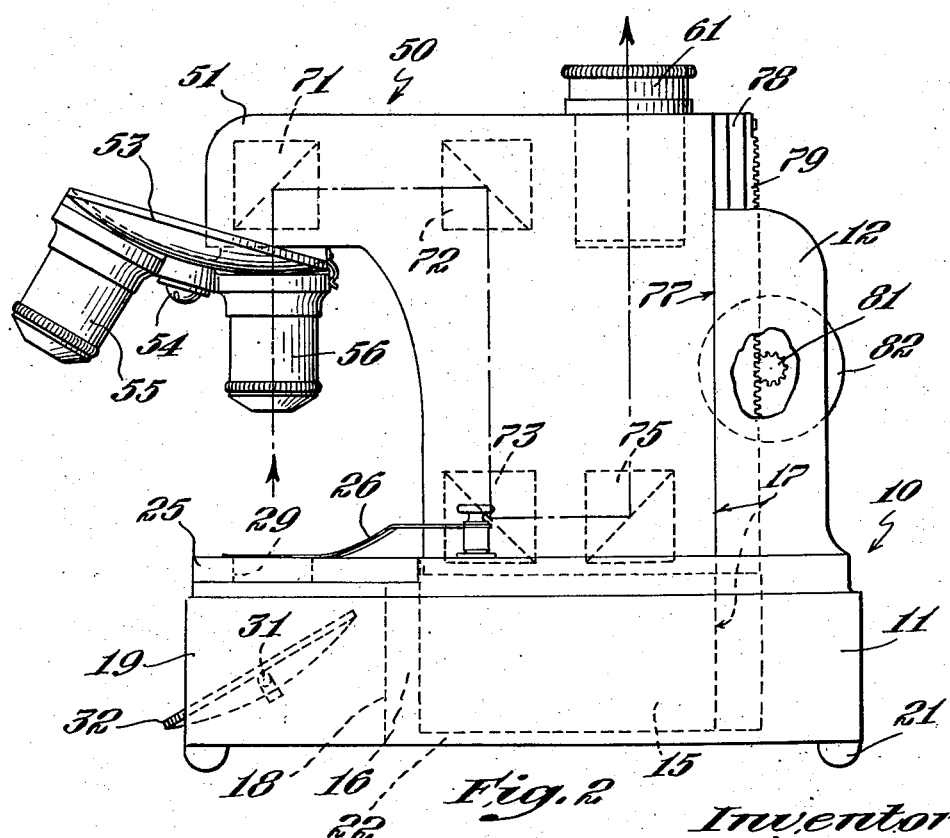
Inventor
Daniel J. O'Brien
by Roberts, Cushman & Grover
attys.

Dec. 30, 1947.    D. J. O'BRIEN    2,433,674
COMPACT MICROSCOPE
Filed Sept. 25, 1945    2 Sheets-Sheet 2
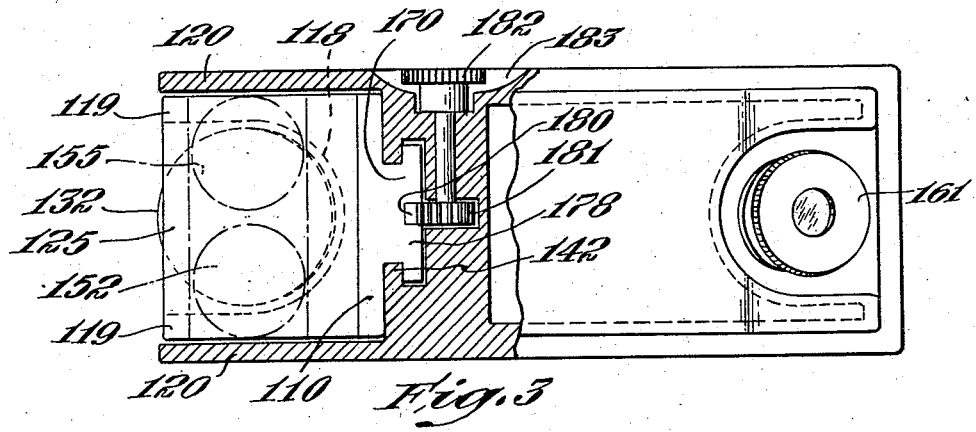
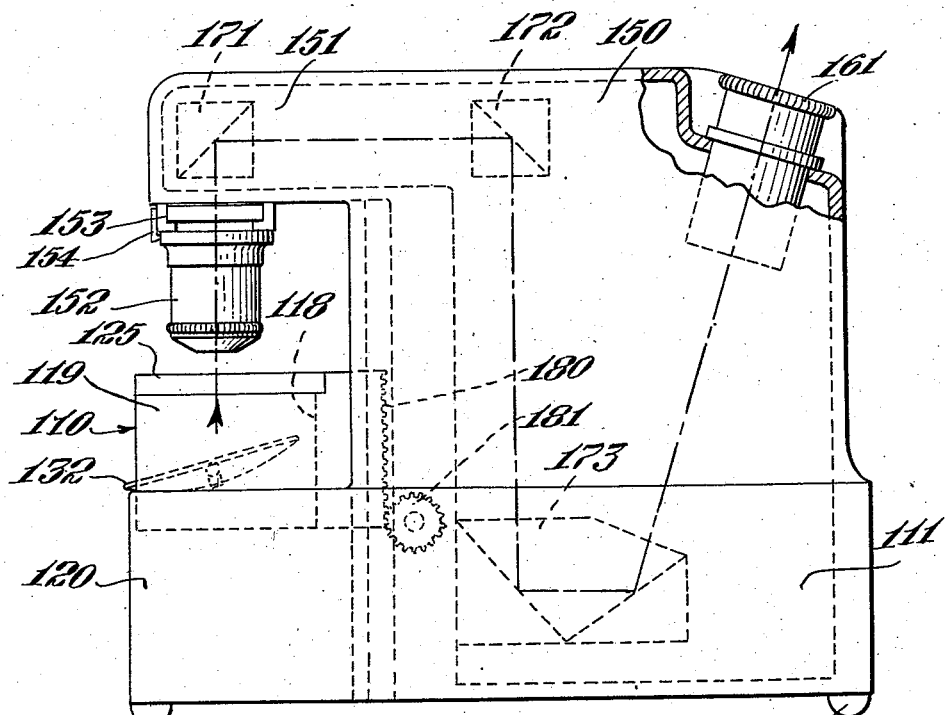
Inventor
Daniel J. O'Brien
by Roberts, Cushman & Grover
attys.

Patented Dec. 30, 1947

2,433,674

UNITED STATES PATENT OFFICE 2,433,674

COMPACT MICROSCOPE

Daniel J. O'Brien, Winthrop, Mass.

Application September 25, 1945, Serial No. 618,490

8 Claims. (Cl. 88—39)

The main object of the present invention is to provide a microscope which is compact, rugged, convenient in setting up and operation, and wherein all elements which do not absolutely have to be accesible, are inherently protected. Instruments according to the invention, although they can be made to comply with all requirements of accuracy and magnification, are therefore especially suitable for routine use where particularly careful handling can not be required, either because of environmental conditions, lack of time, or comparatively only elementary training of the operator.

These objects are obtained, in one of the aspects of the invention, by arranging the elements of a microscope on and within two blocks which constitute protective housings as well as mounting means for these elements, and from which only those elements emerge or protrude which have to receive or emit light, or are necessary for adjusting the instrument; these blocks are preferably provided with smooth surfaces offering a minimum of irregular configurations apt to hinder rapid packing and unpacking and efficient operation. Either one of these blocks may be shaped to provide a base for placing it on a table or similar supporting surface, the other block being adjustably attached to the stationary block.

In another aspect, the objects of the invention are attained by breaking the optical axis of objective and eye lens, which are mounted within one of the above-mentioned blocks, so that this block can be shaped comparatively low, compact and generally conforming to the above-outlined characteristics of instruments according to the invention.

In still another aspect, instruments according to the invention permit the arrangement of objectives and eye lenses at approximately the same level, with these lens systems spatially arranged for most convenient operation, and with the specimen carrying or stage elements so arranged that they can be very easily reached for manipulation and can be more easily observed than the corresponding elements of the conventional microscope.

In a further aspect, the invention provides a microscope whose general shape conforms to the outlines of a simple rectangular box container which it inherently and snugly fits without necessitating special holding or attaching elements, so that the instrument is with certainty protected against injuries due to improper packing, or becoming loose during transport.

A still further aspect of the invention concerns particularly secure protection of the microscope elements and safe construction as a whole by rigidly fastening the entire lens system on the supporting block and mounting the specimen supporting stage adjustably with respect thereto.

These and other objects, aspects and features will appear from the following description of two typical practical embodiments illustrating the novel, general and specific, characteristics of my invention. This description refers to drawings in which Fig. 1 is a top view of a micrscope incorporating the principles of the invention;

Fig. 2 is a side elevation of the instrument according to Fig. 1;

Fig. 3 is a top view, with the front half of the lens block in horizontal section, of a second embodiment of my invention; and Fig. 4 is a side view of the instrument shown in Fig. 3.

In Figs. 1 and 2, numeral 10 denotes a specimen and instrument supporting block of generally rectangular outline, which block has a base portion 11, and an upright column or slide portion 12. The base portion 11 has two side walls, 14, 15 and a front wall 16 which, together with the rear portion, form a well whose rear surface 17 continues flush into the inner surface of column 12, as indicated in Fig. 2. The front portion of the specimen block is recessed as indicated at 18, forming two side brackets 19.

The base portion of the specimen block may be provided with suitable feet 21 and a bottom 22. Bridging brackets 19 is arranged a specimen support plate indicated at 25, which constitutes a microscope stage, upon which slides or similar specimens are held by means of slide clips 26, of conventional construction, which are supported by pins 27 fitting into holes of the side walls 14 and 15 of the specimen block on either side of the above-described well. Swingingly supported in pivots on the brackets 19, at 31 of the specimen block is a substage mirror 32 which can be adjusted by means of handle 28 and which can be swung inwardly so as to provide complete protection thereof by brackets 19. In order to provide the compactness of construction desirable for instruments of this type, the mirror 132 is arranged rather closely to the stage, and has accordingly a shorter radius than conventional substage reflectors. The stage plate 25 may be of transparent material and, as indicated in Fig. 2, provided with a window 29. The above-mentioned inner surface of column portion 12 at the back of the specimen block well is provided with the grooved half 41 (Fig. 1) of a sliding guide arrangement, the dovetailed groove 42 receiving the corresponding second slide element moving therein, as will be described hereinbelow.

The second or lens block is indicated at 50 and has an objective bracket 51 extending from the lens block proper 52 over the specimen holder or stage 25. The bracket 51 supports objective lens 56 which may be screwed directly into the bracket 51, or constitute part of a nose piece 53 of conventional construction, pivoted on bracket 51 at 54, and supporting one or more additional objective lens systems 55.

Fastened to the lens block 50 near the slide face 17 is the eye lens system 61, whose optical axis is displaced a considerable distance from that of the objective 56. In order to provide a continuous optical path for the light beam defined by the two lens systems, reflectors 71, 72, 73, 75 are provided. These reflectors may be of any suitable design, although the prismatic reflectors with enclosed reflecting surfaces, shown in Fig. 2, are preferred for present purposes. It will be understood that the number of reflectors might be reduced by introducing oblique light paths, or that the effective length of the microscope might be increased without increasing its height by introducing an additional branch defined by two prisms; generally speaking, any construction of the beam path defining device is practical, so long as it provides a proper, optically continuous connection between the axially displaced objective and eye lens systems.

On its rear surface 77, the lens block carries fastened thereto the other half of the sliding guide equipment which corresponds to the above described dovetailed slide 41. This slide key 78 has fastened thereto a rack 79 which engages a pinion 81, journaled in column 12 of the specimen block 10 and attached to an adjusting button 82 of conventional shape, which, as indicated in Fig. 1, is confined within the contours of the specimen block base 11. This guide equipment serves for the adjustable alignment of specimen block 10 and lens block 50.

The blocks 10 and 50 may be made of any sufficiently strong and otherwise suitable material, for example aluminum alloy, in the shape of hollow castings to which the reflecting prisms are fastened with any convenient means which are not shown in order to simplify the drawings.

The operation of microscopes according to the invention is essentially similar to that of any conventional microscope. The specimen is placed on support 25, if desired with the aid of clips 26, the substage mirror 32 is adjusted for proper illumination, and the lens block is moved by means of button 82 until the instrument is properly focused.

Figs. 3 and 4 show a second embodiment of the invention, wherein the lens block instead of the specimen block serves as supporting element.

In these figures, numeral 110 denotes a specimen block of generally rectangular form, but recessed in front, forming two brackets 119 which, together with the back wall 118 of the specimen block support the substage mirror 132 and the specimen support 125, which elements may otherwise be similar to those shown in Figs. 1 and 2. The specimen block has on its back face a slide element 170 forming a dovetail 178 which is designed to fit the corresponding slide element of the supporting lens block, to be described hereinbelow. Specimen clips similar to those shown in Figs. 1 and 2 may be provided on either side of the stage 125.

The lens block 150 has a supporting or base portion 111, with feet 121 and two side walls 129 which partly enclose the side walls 119 of the specimen block. The inner face of the lens block has a dovetailed slide groove 142 designed to fit key 178 of the specimen block. An objective bracket 151 extends from the lens block over the specimen block and supports an objective lens 152, which may be individually mounted, or constitute part of a nose piece device similar to that shown in Figs. 1 and 2, or of a slide fitting 153, slidingly supporting objective lens systems 152 and 155, either of which may be centered with the instrument optics as a whole by means of a click 154 or a similar suitable fixating device. The eye lens 161 is mounted on lens block 150, and may be inclined and recessed, as indicated in Fig. 4, in order to provide more convenient operation, and protection during packing and transport.

The light beam is reflected from objective 152 to eye lens 161 by prisms 171, 172, and 173, or by any other suitable light beam defining construction. Again, the reflector elements are fastened to the lens block by suitable mounting means.

The above-mentioned slide elements 178 and 142, the latter forming part of the lens block 150, are inter-related by a rack 180 and pinion 181. The adjustment button 182 is accessibly confined in a recess 183 of the lens block, in order to provide protection and smooth contour.

This instrument is operated as indicated above with reference to Figs. 1 and 2, and it will be observed that the modification according to Figs. 3 and 4 protects all necessarily accessible parts of the instrument especially well, all protruding or in any way cumbersome portions being avoided, and the outside contours being especially well adapted for packing in a rectangular box and for rough usage.

It should be understood that the present disclosure is for the purpose of illustration only and that this invention includes all modifications and equivalents which fall within the scope of the appended claims.

I claim:

1. A microscope comprising a hollow lens block having guide means; a specimen block carrying a stage and substage and having guide means cooperating with said guide means on the lens block to provide relative movement between the two blocks in the direction substantially perpendicular to said stage; said lens block having an objective bracket which extends over said stage and is spaced therefrom to provide a recess between the bracket and the stage, said bracket carrying an objective pointing towards said stage with its optical axis substantially parallel to said direction of movement, an eye piece mounted on said lens block approximately in a plane extending through the objective perpendicular to its axis and with the optical axis of the eye piece laterally displaced from that of the objective, and a reflecting system mounted in the lens block, said reflecting system including a reflector mounted on said bracket in optical alignment with the objective and reflector means positioned in said lens block to extend below and laterally spaced from said objective to direct the light from the objective into the eye piece in a path having the effective length of that of a conventional microscope; and supporting base means for said microscope fastened to one of said blocks.

2. A microscope comprising a hollow lens block having guide track means; a specimen block carrying between two walls a stage and substage and having guide track means engaging said track means on the lens block to provide movement between one block within a recessed portion of the other block in the direction substantially perpendicular to said stage; and means for adjusting the relative position of the two blocks; said lens block having an objective bracket which extends over said stage and is spaced therefrom to provide a recess between the bracket and the stage, said bracket carrying an objective pointing towards said stage with its optical axis substantially parallel to said direction of movement, an eye piece mounted on said lens block approximately in a plane extending through the objective perpendicular to its axis and with the optical axis of the eye piece laterally displaced from that of the objective, and a reflecting system mounted in the lens block, said reflecting system including a reflector mounted on said bracket in optical alignment with the objective and reflector means positioned in said lens block to extend below and laterally spaced from said objective to direct the light from the objective into the eye piece in a path having the effective length of that of a conventional microscope; and supporting base means for said microscope fastened to one of said blocks.

3. A microscope comprising a hollow lens block having guide means; and a base carrying a stage and substage and having guide means cooperating with said guide means on the lens block to provide relative movement between the lens block and the base in the direction substantially perpendicular to said stage; said lens block having an objective bracket which extends over said stage and is spaced therefrom to provide a recess between the bracket and the stage, said bracket carrying an objective pointing towards said stage with its optical axis substantially parallel to said direction of movement, an eye piece mounted on said lens block approximately in a plane extending through the objective perpendicular to its axis and with the optical axis of the eye piece laterally displaced from that of the objective, and a reflecting system mounted in the lens block, said reflecting system including a reflector mounted on said bracket in optical alignment with the objective and reflector means positioned in said lens block to extend below and laterally spaced from said objective to direct the light from the objective into the eye piece in a path having the effective length of that of a conventional microscope.

4. A microscope comprising a base from which rises at one side a supporting column rigidly connected thereto, said base having on the other side a lateral recess, said base supporting a substage in said recess and supporting a stage above said substage, said base being recessed to form a well between said column and said stage, and said base forming a guiding face at the inner side of said column; a hollow lens block substantially fitting said well, having a face contacting said face of said column, having an objective bracket which extends over said stage and is spaced therefrom to provide a recess between the bracket and the stage, said bracket carrying an objective pointing towards said stage with its optical axis substantially parallel to said faces, said lens block having an eye piece mounted thereon near said column approximately in a plane extending through the objective perpendicular to its axis and with the optical axis of the eye piece laterally displaced from that of the objective, and said lens block having a reflecting system, said reflecting system including a reflector mounted on said bracket in optical alignment with the objective and reflector means positioned in said lens block to extend below and laterally spaced from said objective to direct the light from the objective into the eye piece in a path having the effective length of that of a conventional microscope; and means associated with said faces for adjusting the distance between said objective and said stage.

5. A microscope comprising a base from which rises at one side a supporting column rigidly connected thereto, said base having on the other side a lateral recess, said base supporting a substage in said recess and supporting a stage above said substage, said recess having a wall which forms with the side walls of the base a well between said column and said stage, and said base having a guide track at the inner side of said column; a hollow lens block substantially fitting said well, having a guide track contacting said track of said column, having an objective bracket which extends over said stage and is spaced therefrom to provide a recess between the bracket and the stage, said bracket carrying an objective pointing towards said stage with its optical axis substantially parallel to said faces, said lens block having an eye piece mounted thereon near said column approximately in a plane extending through the objective perpendicular to its axis and with the optical axis of the eye piece laterally displaced from that of the objective, and said lens block having a reflecting system, said reflecting system including a reflector mounted on said bracket in optical alignment with the objective and reflector means positioned in said lens block to extend below and laterally spaced from said objective to direct the light from the objective into the eye piece in a path having the effective length of that of a conventional microscope; and means associated with said tracks for adjusting the distance between said objective and said stage.

6. A microscope comprising a hollow lens block having supporting base means and guide means; and a specimen block carrying a stage and substage and having guide means cooperating with said guide means on the lens block to provide relative movement between the two blocks in the direction substantially perpendicular to said stage; said lens block having an objective bracket which extends over said stage and is spaced therefrom to provide a recess between the bracket and the stage, said bracket carrying an objective pointing towards said stage with its optical axis substantially parallel to said direction of movement, an eye piece mounted on said lens block approximately in a plane extending through the objective perpendicular to its axis and with the optical axis of the eye piece laterally displaced from that of the objective, and a reflecting system mounted in the lens block, said reflecting system including a reflector mounted on said bracket in optical alignment with the objective and reflector means positioned in said lens block to extend below and laterally spaced from said objective to direct the light from the objective into the eye piece in a path having the effective length of that of a conventional microscope.

7. A microscope comprising a hollow lens block having supporting base means for the microscope and a guiding face; a specimen carrier supporting a substage and a stage above said substage, and having a face contacting said face of lens block to provide relative movement between the specimen carrier and the lens block in the direction substantially perpendicular to said stage; said lens block having an objective bracket which extends over said stage and is spaced therefrom to provide a recess between the bracket and the stage, said bracket carrying an objective pointing towards said stage with its optical axis substantially parallel to said direction of movement, said lens block having an eye piece mounted thereon approximately in a plane extending through the objective perpendicular to its axis and with the optical axis of the eye piece laterally displaced from that of the objective, and said lens block having a reflecting system, said reflecting system including a reflector mounted on said bracket in optical alignment with the objective and reflector means positioned in said lens block to extend below and laterally spaced from said objective to direct the light from the objective into the eye piece in a path having the effective length of that of a conventional microscope; and means associated with said faces for adjusting the distance between said objective and said stage.

8. A microscope comprising a hollow lens block having supporting base means for the microscope and a guide track between two laterally extending walls forming a recess; a specimen carrier supporting a substage in said recess and supporting a stage above said substage, and having a guide track contacting said track of said lens block to provide relative movement between the specimen carrier and the lens block in the direction substantially perpendicular to said stage; said lens block having an objective bracket which extends over said stage and is spaced therefrom to provide a recess between the bracket and the stage, said bracket carrying an objective pointing towards said stage with its optical axis substantially parallel to said direction of movement, said lens block having an eye piece mounted thereon approximately in a plane extending through the objective perpendicular to its axis and with the optical axis of the eye piece laterally displaced from that of the objective, and said lens block having a reflecting system, said reflecting system including a reflector mounted on said bracket in optical alignment with the objective and reflector means positioned in said lens block to extend below and laterally spaced from said objective to direct the light from the objective into the eye piece in a path having the effective length of that of a conventional microscope; and means associated with said tracks for adjusting the distance between said objective and said stage.

DANIEL J. O'BRIEN.

REFERENCES CITED

The following references are of record in the file of this patent:

UNITED STATES PATENTS

| Number | Name | Date |
|---|---|---|
| 883,868 | Ford | Apr. 7, 1908 |
| 1,649,303 | Glessner | Nov. 15, 1927 |
| 2,135,870 | Fassin | Nov. 8, 1938 |
| 2,146,506 | Maisch | Feb. 7, 1939 |
| 2,214,367 | Gallasch | Sept. 10, 1940 |
| 2,360,268 | Ott | Oct. 10, 1944 |

FOREIGN PATENTS

| Number | Country | Date |
|---|---|---|
| 414,324 | Great Britain | Aug. 2, 1934 |
| 601,154 | France | Nov. 23, 1925 |